US012675305B2

(12) United States Patent
Sinha et al.

(10) Patent No.: US 12,675,305 B2
(45) Date of Patent: Jul. 7, 2026

(54) SYSTEM AND METHOD FOR PROVIDING A SMART HELP EXTENSION FOR USE WITH AN ANALYTICS ENVIRONMENT

(71) Applicant: Oracle International Corporation, Redwood Shores, CA (US)

(72) Inventors: Anurag Sinha, Uttar Pradesh (IN); Prakhar Rastogi, Moradabad (IN); Nilesh Sahu, Odisha (IN); Harish Dalmia, Bengaluru (IN); Rajesh Balu, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 773 days.

(21) Appl. No.: 17/674,734

(22) Filed: Feb. 17, 2022

(65) Prior Publication Data

US 2023/0259375 A1     Aug. 17, 2023

(51) Int. Cl.
 *G06F 9/451* (2018.01)
 *G06F 9/445* (2018.01)
(52) U.S. Cl.
 CPC .......... *G06F 9/453* (2018.02); *G06F 9/44526* (2013.01)
(58) Field of Classification Search
 CPC ....... G06F 9/453; G06F 9/44526; G06F 3/048
 See application file for complete search history.

(56) References Cited

U.S. PATENT DOCUMENTS

| | | | | |
|---|---|---|---|---|
| 7,024,658 | B1 * | 4/2006 | Cohen | G06F 9/453 |
| | | | | 715/705 |
| 7,506,257 | B1 * | 3/2009 | Chavez | G06F 11/1469 |
| | | | | 715/714 |
| 7,865,829 | B1 * | 1/2011 | Goldfield | G06Q 40/02 |
| | | | | 715/713 |
| 2006/0080607 | A1 * | 4/2006 | Cohen | G06F 9/453 |
| | | | | 715/705 |
| 2006/0184654 | A1 * | 8/2006 | Melo | H04L 41/0879 |
| | | | | 714/E11.207 |
| 2011/0307780 | A1 * | 12/2011 | Harris | G06F 9/453 |
| | | | | 715/708 |
| 2013/0159851 | A1 * | 6/2013 | Pawar | G06F 3/0481 |
| | | | | 715/708 |
| 2013/0185624 | A1 * | 7/2013 | Appleyard | G06Q 10/10 |
| | | | | 715/234 |

(Continued)

*Primary Examiner* — Mustafa A Amin
(74) *Attorney, Agent, or Firm* — TUCKER ELLIS LLP

(57) ABSTRACT

In accordance with an embodiment, described herein is a system and method for providing a smart help browser extension for use with an analytics environment. An analytic applications environment can be provided by, or otherwise operate at, a computer system providing access to a data warehouse, or data warehouse instance. A smart help browser extension provides a user-interface based, reusable and configurable plugin that can be dynamically configured in order to provide relevant help content. An end-user can be provided with options on how to view the help content, such as via a help bubble of text, an image, or video, for example. The disclosed extension can also provide admins, or other technical users of the analytics environment, with the ability to record custom help content for other (e.g., non-technical) users of the analytics environment.

20 Claims, 12 Drawing Sheets

(56) References Cited

U.S. PATENT DOCUMENTS

| | | | |
|---|---|---|---|
| 2015/0242297 A1* | 8/2015 | Johnson, Jr. ........ | G06F 11/3616 |
| | | | 702/186 |
| 2019/0303107 A1* | 10/2019 | Kelly .................... | G06N 20/10 |
| 2020/0073684 A1* | 3/2020 | Shamseddin ....... | G06F 3/04895 |

* cited by examiner

SYSTEM AND METHOD FOR PROVIDING A SMART HELP EXTENSION FOR USE WITH AN ANALYTICS ENVIRONMENT

COPYRIGHT NOTICE

TECHNICAL FIELD

Embodiments described herein are generally related to data analytics, and computer-based methods of providing business intelligence or other types of data, and are particularly related to a system and method for providing a smart help browser extension for use with an analytics environment.

BACKGROUND

Data analytics enables computer-based examination of large amounts of data, for example to derive conclusions or other information from the data. For example, business intelligence tools can be used to provide users with business intelligence describing their enterprise data, in a format that enables the users to make strategic business decisions.

Increasingly, data analytics can be provided within the context of enterprise software application environments, such as, for example, an ORACLE™ Fusion Applications environment; or within the context of software-as-a-service (SaaS) or cloud environments, such as, for example, an ORACLE™ Analytics Cloud or ORACLE™ Cloud Infrastructure environment; or other types of analytics application or cloud environments. However, different customers or users may have different requirements or preferences with regard to how their data is provided, which generally requires configuration of particular key performance indicators (KPI's) for use by those customers/users.

SUMMARY

In accordance with an embodiment, described herein is a system and method for providing a smart help browser extension for use with an analytics environment. An analytic applications environment can be provided by, or otherwise operate at, a computer system providing access to a data warehouse, or data warehouse instance. A smart help browser extension provides a user-interface based, reusable, and configurable plugin that can be dynamically configured in order to provide relevant help content. An end-user can be provided with options on how to view the help content, such as via a help bubble of text, an image, or video, for example. The disclosed extension can also provide admins, or other technical users of the analytics environment, with the ability to record custom help content for other (e.g., non-technical) users of the analytics environment.

DETAILED DESCRIPTION

Figure 1:
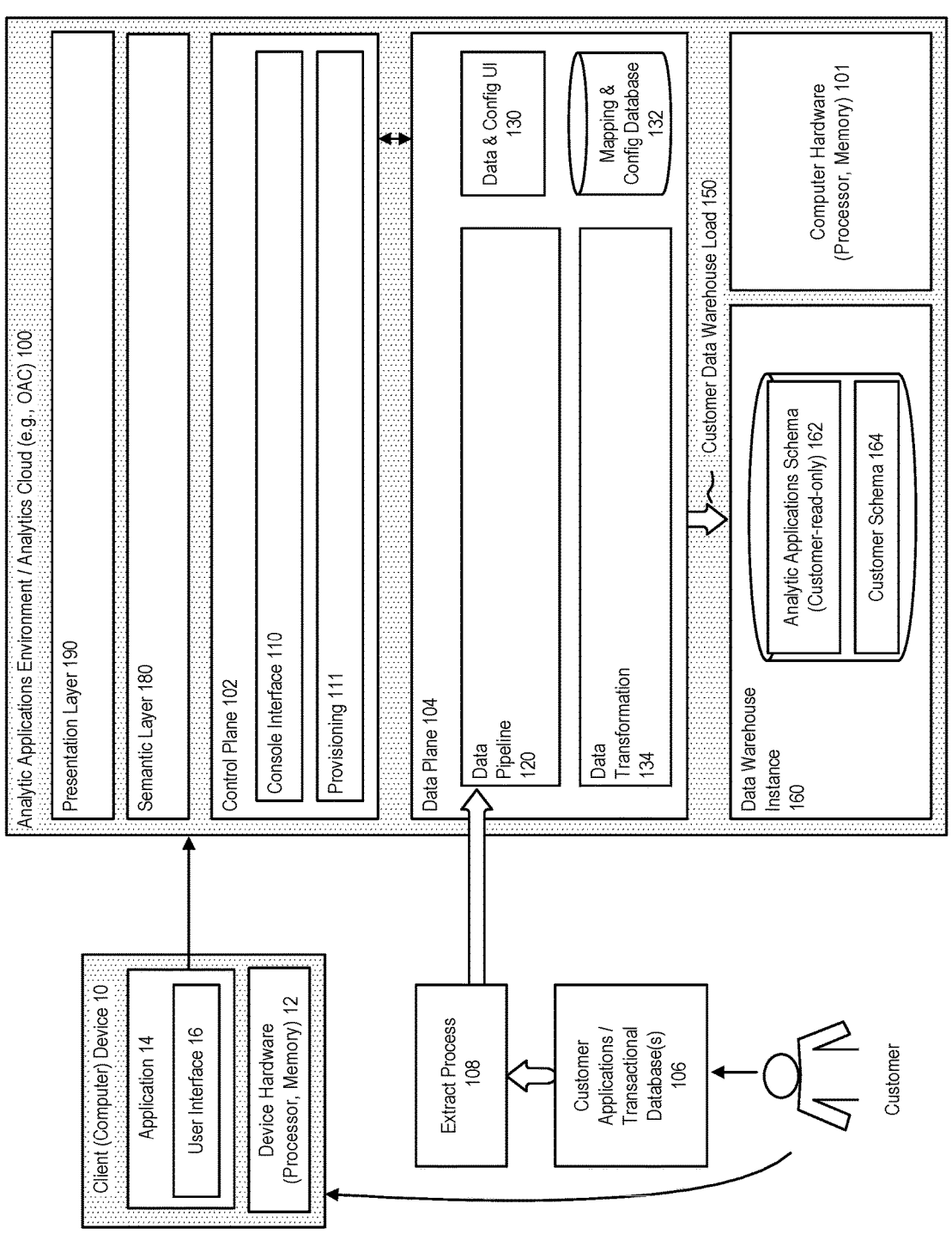
FIG. 1 illustrates a system for providing an analytic applications environment, in accordance with an embodiment.

In accordance with an embodiment, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an ORACLE™ Fusion Applications environment or other type of enterprise software application or data environment; or within the context of a software-as-a-service (SaaS) or cloud environment, such as, for example, an ORACLE™ Analytics Cloud or ORACLE™ Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

INTRODUCTION

In accordance with an embodiment, a data warehouse environment or component, such as, for example, an ORACLE™ Autonomous Data Warehouse (ADW), ORACLE™ Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, ORACLE™ Fusion Applications; while other enterprise software products or components, such as, for example, ORACLE™ ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse-a process which can be both time and resource intensive.

In accordance with an embodiment, the analytic applications environment allows customers (tenants) to develop computer-executable software analytic applications for use with a BI component, such as, for example, an ORACLE™ Business Intelligence Applications (OBIA) environment, or other type of BI component adapted to examine large amounts of data sourced either by the customer (tenant) itself, or from multiple third-party entities.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Analytic Applications Environment

FIG. 1 illustrates a system for providing an analytic applications environment, in accordance with an embodiment.

The example shown and described in FIG. 1 is provided for purposes of illustrating an example of one type of data analytics environment that can utilize the various embodiments of KPI customization as described herein. In accordance with other embodiments and examples, the KPI customization features that are described herein can be used with other types of data analytics environments.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an ORACLE™ Analytics Cloud or ORACLE™ Cloud Infrastructure environment, or other type of cloud environment. For example, in accordance with an embodiment, the control plane can include a console interface 110 that enables access by a client computer device 10 having a device hardware 12, application 14, and user interface 16, under control of a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse. In accordance with an embodiment, the data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Analytics Cloud Environments

In accordance with an embodiment, an analytic applications environment can be provided in association with an analytics cloud environment (analytics cloud), such as, for example, an ORACLE™ Analytics Cloud (OAC) environment. Such an environment provides a scalable and secure public cloud service that provides capabilities to explore and perform collaborative analytics. Additional features provided by an analytics cloud environment can include, for example:

High-performance platform with flexible data storage.

Data preparation: Analysts can ingest, profile, and cleanse data using a variety of algorithms.

Data flow: Analysts can prepare, transform and aggregate data, and then run machine-learning models at scale.

Data discovery: Subject matter experts can collaborate with business users, blending intelligent analysis at scale, machine learning, and statistical modeling.

Data visualization: Analysts can visualize any data, on any device, on premises and in the cloud.

Data collaboration: Organizations can share data, without the need to manage or consolidate multiple versions of spreadsheets, and quickly perform ad hoc analysis of the spreadsheet data.

Data-driven: Application developers can utilize interfaces that enable them to extend, customize, and embed rich analytic experiences in the application flow; for example, to take data from any source, and explore and collaborate with real-time data.

Extensibility and Customization

Different customers of a data analytics environment may have different requirements with regard to how their data is classified, aggregated, or transformed, for purposes of providing data analytics or business intelligence data, or developing software analytic applications.

In accordance with an embodiment, to support such different requirements, the system can include a semantic layer 180 that enables the use of custom semantic extensions to extend a semantic data model (semantic model), and provide custom content at a presentation layer 190. Extension wizards or development environments can guide users in using the custom semantic extensions to extend or customize the semantic model, through a definition of branches and steps, followed by promotion of the extended or customized semantic model to a production environment.

In accordance with various embodiments, technical advantages of the described approach include support for additional types of data sources. For example, a user can perform data analytics based on a combination of ERP data sourced from a first vendor's product and HCM data sourced from a second, different vendor's product; or based on a combination of data received from multiple data sources having different regulatory requirements. A user's defined extensions or customizations can endure patches, updates, or other changes to the underlying system.

Smart Help Extension for Analytics Environment

In accordance with an embodiment, one of the issues for non-technical users of an analytics environment is that such users may be unaware of many of the features of the analytics environment. Important gestures, such as right-clicking and drag-and-drop functionality are often hidden. Likewise, the functionality and usefulness of such features can may be unknown to non-technical or novice users of such analytics environments. It can be tedious to go through existing help documentation and filter out the information needed.

In accordance with an embodiment, a smart help browser extension is provided herein that provides a user-interface based, reusable and configurable plugin. The plugin can be dynamically configured in order to provide relevant help content. An end-user can be provided with options on how to view the help content, such as via a help bubble of text, an image, or video, for example.

In accordance with an embodiment, the disclosed extension can also provide admins, technical users, or sophisticated/knowledgeable users of the analytics environment, with the ability to record custom help content for other (e.g., non-technical) users of the analytics environment.

In accordance with an embodiment, the smart help extension can be utilized, for example, as a product walkthrough. The extension can also be used for improved feature (e.g., newly added feature) adoption and use by users of the analytics environment.

In accordance with an embodiment, three of the features provided by the smart help extension can include a guided help option (e.g., wizard), an in-place help option, and a record option.

In accordance with an embodiment, the wizard option can provide an interactive experience that walks a user through a step, or steps to complete a task (e.g., key tasks) within the analytics environment.

In accordance with an embodiment, the in-place help option can provide targeted, "in-place" help content on specific components within a user interface. Such in-place help options can be signified by, e.g., an icon displayed to a user that, when selected by the user, displays recorded, or dynamically generated, help-content to a user.

In accordance with an embodiment, the record option provides administrators, or other users, the ability to record custom help content (e.g., tips, walkthroughs, warnings) for selected portions of a user interface. Once recorded, the help content can then be accessed via, e.g., the in-place help option or via the wizard option.

Figure 2:
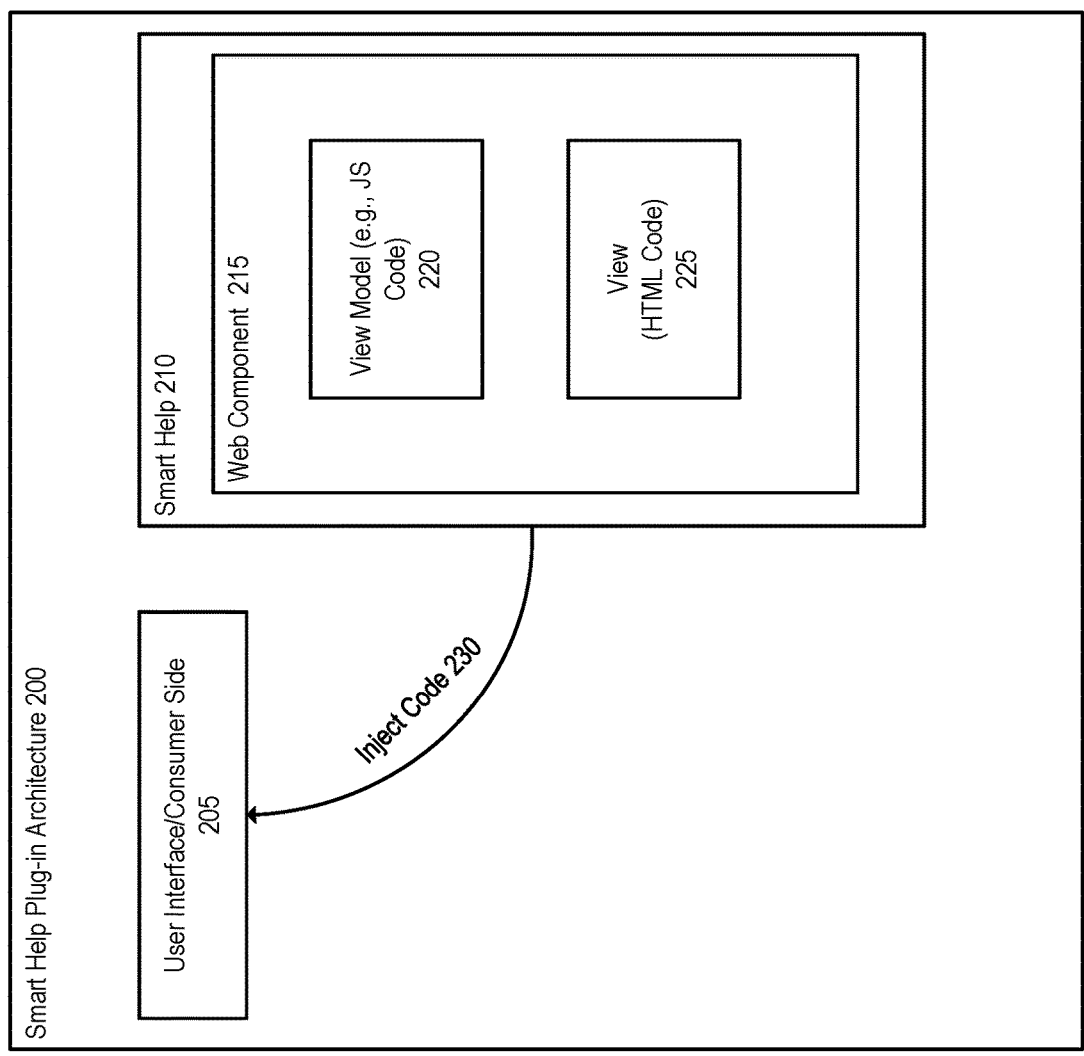
FIG. 2 illustrates an architecture for a smart help plug in, in accordance with an embodiment.

FIG. 2 illustrates an architecture for a smart help plug in, in accordance with an embodiment.

In accordance with an embodiment, the smart help plug-in architecture 200 can comprise both a user interface/consumer side 205 and a smart help plug-in 210. The smart help plug-in 210 can comprise a web component 215. For example, the web component can comprise a JET composite. JET allows developers to create custom web components which can be composites of other components, HTML, JavaScript, or CSS. These reusable pieces of UI can be embedded as custom HTML elements and are registered using the Composite API. These custom Web Components can be referred to as "composites".

In accordance with an embodiment, once registered within a page, a composite component can be used in the DOM as a custom HTML element. A composite element can be recognized by the framework after its module is loaded by the application.

In accordance with an embodiment, within the web component, a view model 200 and a view 225 can be constructed/provided. Code from the web component 215 can be injected 230 into the user interface/consumer side 205, thereby allowing viewing and interaction with the smart help plug-in via a user interface 205.

Figure 3:
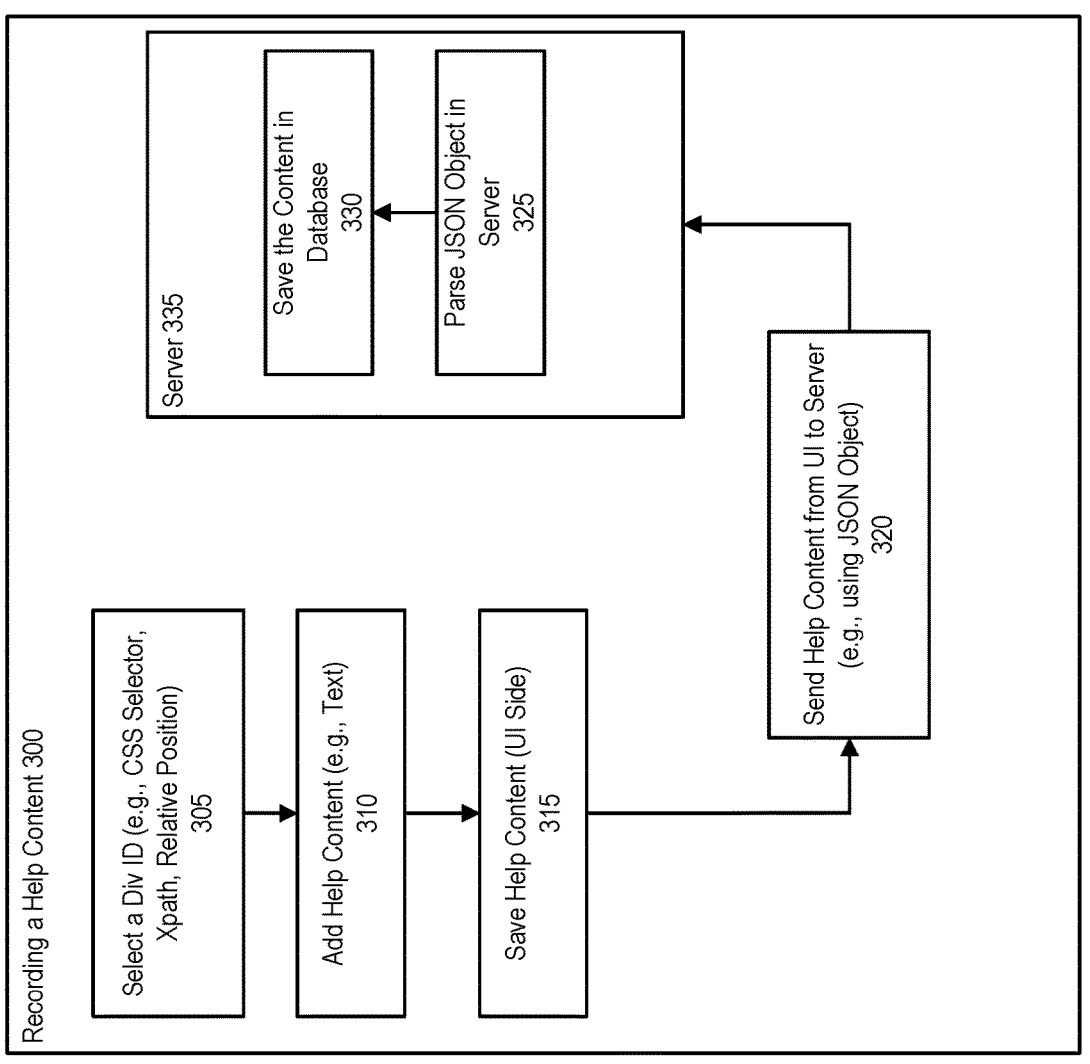
FIG. 3 shows a flowchart of a recording a help content, in accordance with an embodiment.

FIG. 3 shows a flowchart of a recording a help content, in accordance with an embodiment.

In accordance with an embodiment, recording a help content 300, such as a help content for the described herein smart help plug-in, can be performed via, e.g., a user interface, as described above.

In accordance with an embodiment, recording a help content can begin with receiving an indication of a selection of a content division element 305 (also referred to herein as a <div> tag, or "div"). A div can comprise a tag that defines a division or a section in an HTML document, such as a webpage. Such indication of a selection of a div can be performed, for example, via a CSS (Cascade Styling Sheet) selector, an XPath, or an indication of a relative position within, e.g., a webpage.

In accordance with an embodiment, recording a help content for a smart help plug-in can then add a help content 310. This can be, for example, a text, a video, an image . . . etc. This help content can then be saved 315. This save can be triggered, for example, automatically or via an instruction received via the user interface.

In accordance with an embodiment, the help content can be sent 320 from the user interface to a backend server 335, e.g., as an object, such as a JSON object.

In accordance with an embodiment, at the server 335, the object can be parsed 325 and then saved in a database 330. Such saved help content can then be later retrieved on, for example, a calling from the user interface for an application of the smart help plug-in.

Figure 4:
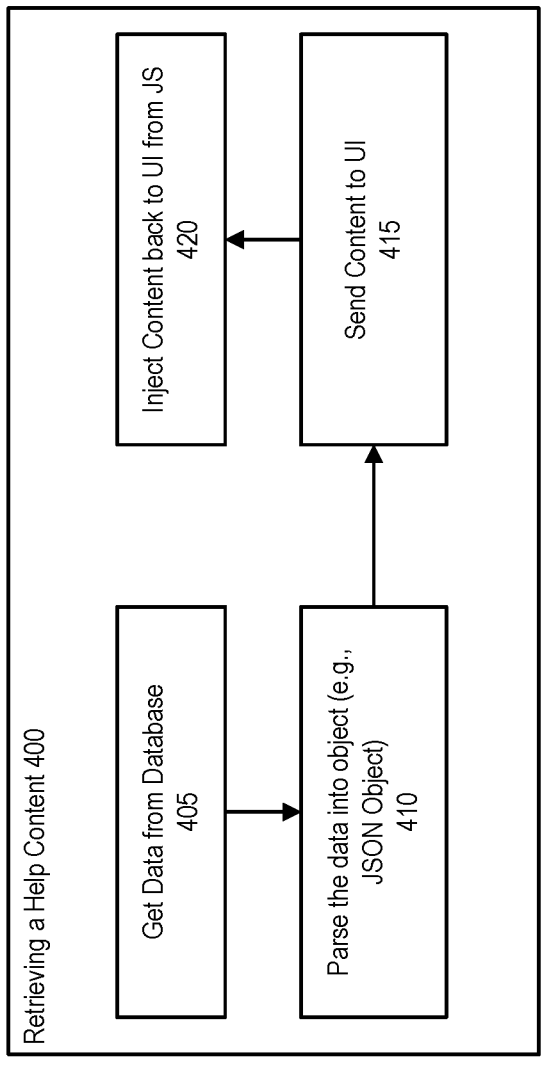
FIG. 4 shows a flowchart of a retrieving a help content, in accordance with an embodiment.

FIG. 4 shows a flowchart of a retrieving a help content, in accordance with an embodiment.

In accordance with an embodiment, retrieving a help content 400, such as a help content for the described herein smart help plug-in, can be performed via, e.g., a user interface, as described above.

In accordance with an embodiment, whether selected via a wizard option or via an in-place help option, the method can begin with retrieving the help data from a database 405.

In accordance with an embodiment, the method can continue with parsing the retrieved data in an object, such as a JSON object, at 410. Such an object can then be sent to a user-interface component at 415.

In accordance with an embodiment, based upon the user's selection of wizard or in-place help, the help content can then be injected into the user interface at 420, e.g., as JavaScript.

Figure 5:
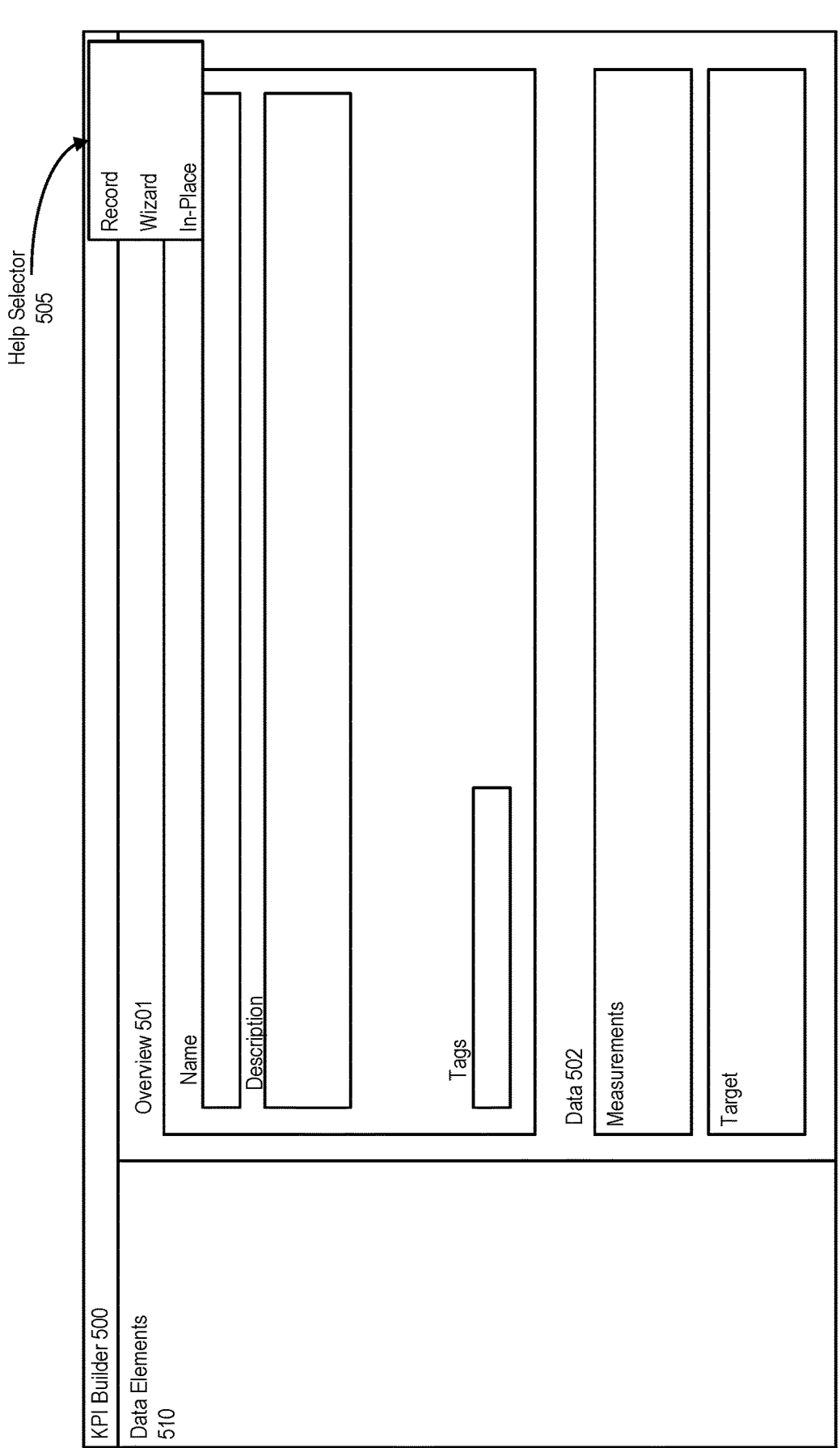
FIG. 5 shows an exemplary screenshot for a smart help plug-in, in accordance with an embodiment.

FIG. 5 shows an exemplary screenshot for a smart help plug-in, in accordance with an embodiment.

More specifically, in accordance with an embodiment, FIG. 5 shows an implementation of the smart help extension within the context of a KPI builder 500 user interface as implemented by an analytics environment. The KPI builder user interface can comprise a data elements 510 portion, an overview 501 portion, and a data portion 502 As displayed, the smart help extension can provide a widget 505 (e.g., smart help widget) within a KPI builder UI. The features of the widget are configured to be launched from the context-based header. A user can turn on/off or can skip individual features after the widget is installed. The help selector/wizard can provide selectable options, such as record, wizard, and in-place.

In accordance with an embodiment, when the wizard option is selected, a user can be presented, via a UI, with step-by-step walkthroughs on how to create, for example, a KPI. Various items on the UI of the KPI builder can be highlighted so that a user can create objects on the fly.

In accordance with an embodiment, when the in-place option is selected, a user can be presented, via a UI, with icons, such as "help" or "information" icons on selected items within the KPI builder UI. When selected by the users, associated information, such as help content, can be provided to a user via, e.g., popup windows or text boxes. Users can then click through the correspondingly displayed help content.

In accordance with an embodiment, when the record option is selected, an authorized user, such as an admin or other technical user, can be allowed to create and record help content associated with selected portions of the KPI builder UI. Such recordings can be made available to record out of the box help content for other users of the analytic system. In addition, customer or service administrators can also record help for specific, customized content that is specific to a respective customer or service utilizing the analytics environment.

Figure 6:
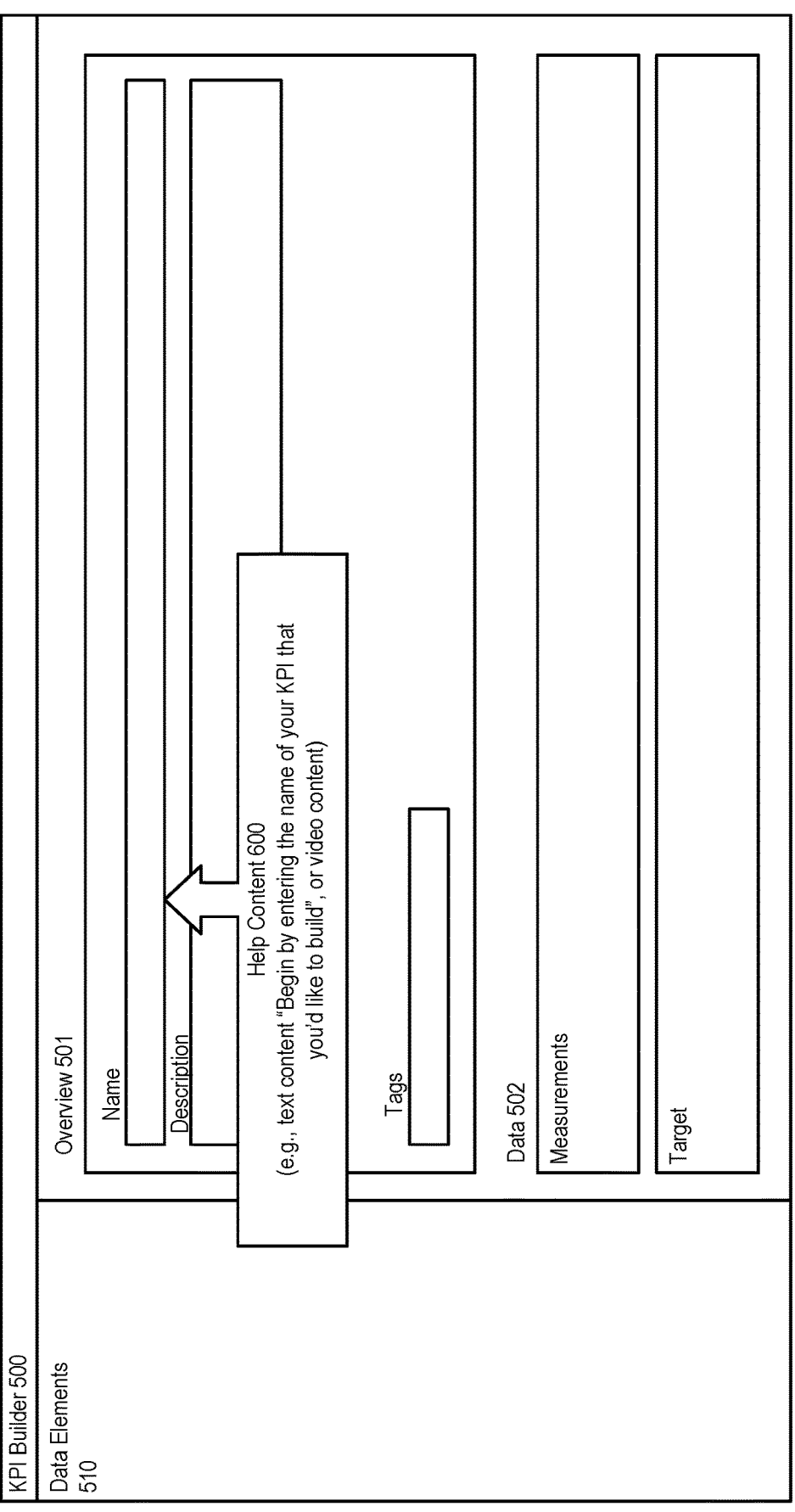
FIG. 6 shows an exemplary screenshot for a smart help plug-in, in accordance with an embodiment.

FIG. 6 shows an exemplary screenshot for a smart help plug-in, in accordance with an embodiment.

More specifically, in accordance with an embodiment, FIG. 6 shows an implementation of the smart help extension within the context of a KPI builder 500 user interface as implemented by an analytics environment when the wizard option has been selected. The KPI builder user interface can comprise a data elements 510 portion, an overview 501 portion, and a data portion 502.

In accordance with an embodiment, when the wizard option is selected, a user can be presented, via a UI, with step-by-step walkthroughs on how to create, for example, a KPI. Various items on the UI of the KPI builder can be highlighted so that a user can create objects on the fly. This can be presented via the user interface by a help content 600 that can provide, for example, help content (e.g., instructions on what text to enter in the "Name" field).

In accordance with an embodiment, the help content 600 can comprise text, images, graphics, videos, and the like.

Figure 7:
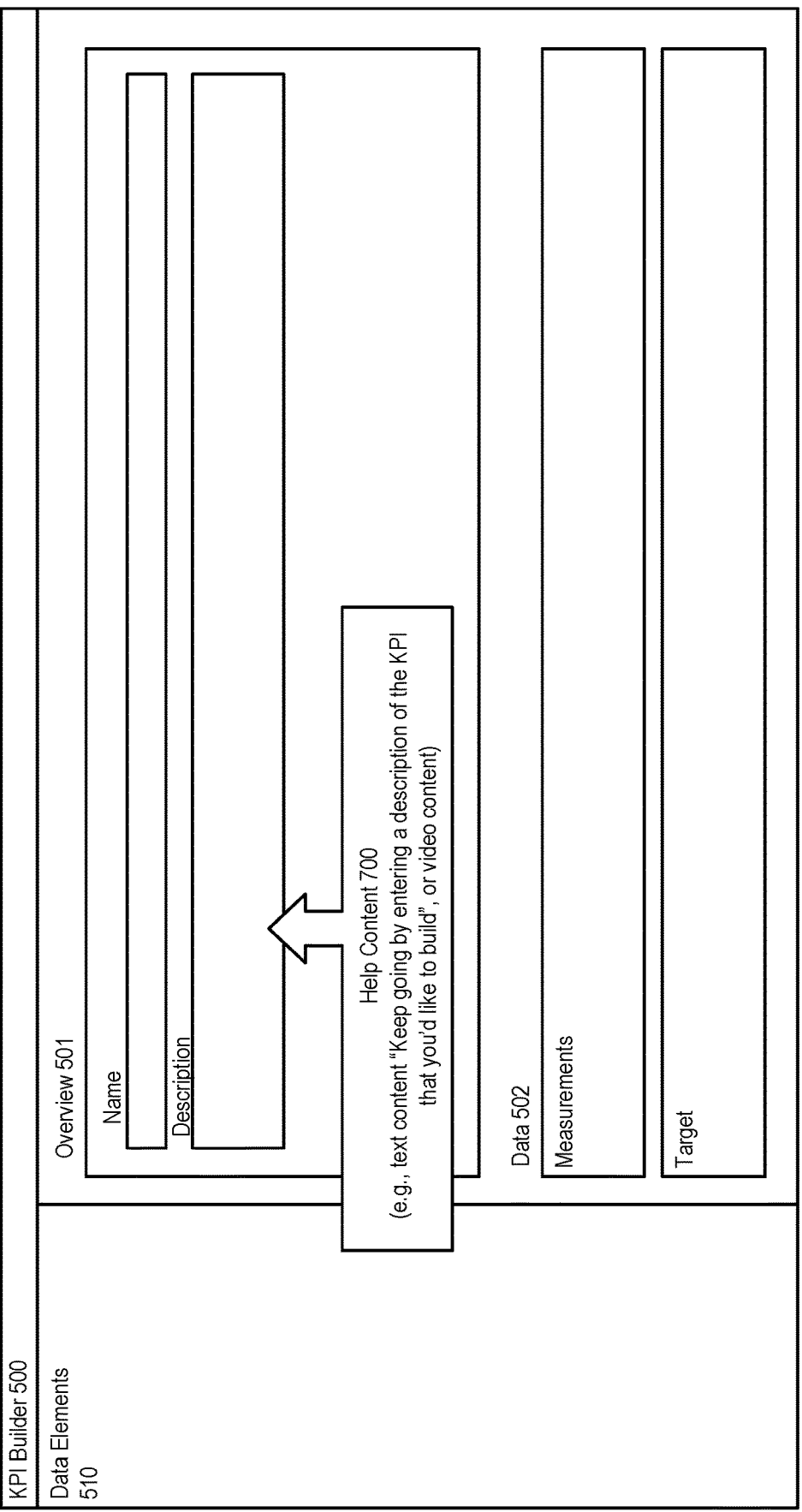
FIG. 7 shows an exemplary screenshot for a smart help plug-in, in accordance with an embodiment.

FIG. 7 shows an exemplary screenshot for a smart help plug-in, in accordance with an embodiment.

More specifically, in accordance with an embodiment, FIG. 7 shows an implementation of the smart help extension within the context of a KPI builder 500 user interface as implemented by an analytics environment when the wizard option has been selected. FIG. 7 shows an immediate step after the embodiment shown in FIG. 6, wherein the next portion of the help content 700 is displayed, via the user interface. The KPI builder user interface can comprise a data elements 510 portion, an overview 501 portion, and a data portion 502.

In accordance with an embodiment, when the wizard option is selected, a user can be presented, via a UI, with step-by-step walkthroughs on how to create, for example, a KPI. Various items on the UI of the KPI builder can be highlighted so that a user can create objects on the fly. This can be presented via the user interface by a help content 700 that can provide, for example, the next help content in a stored wizard series of help contents, such as instructions on what text to enter in the "Description" field).

In accordance with an embodiment, the help content 700 can comprise text, images, graphics, videos, and the like.

Figure 8:
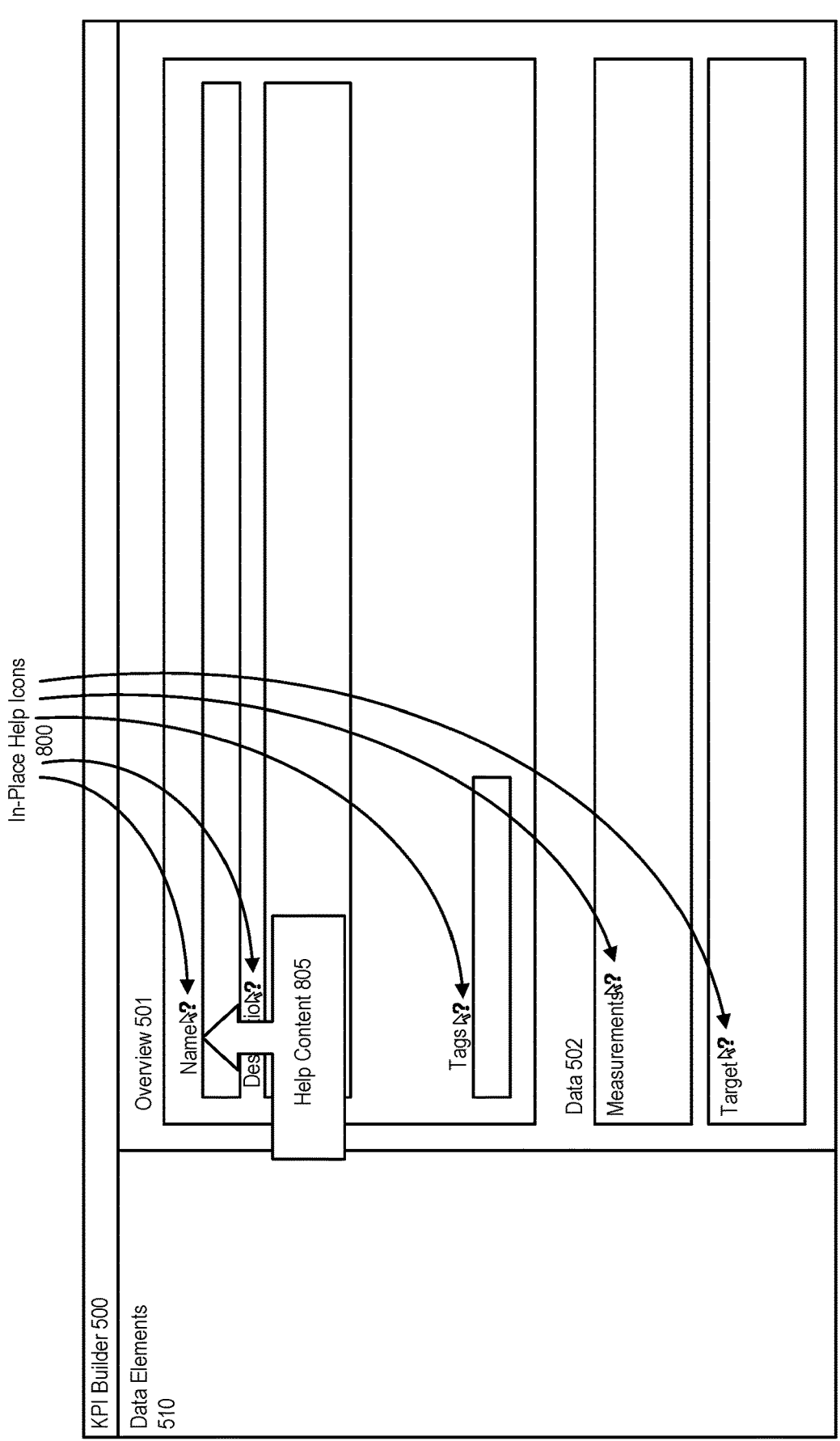
FIG. 8 shows an exemplary screenshot for a smart help plug-in, in accordance with an embodiment.

FIG. 8 shows an exemplary screenshot for a smart help plug-in, in accordance with an embodiment.

More specifically, in accordance with an embodiment, FIG. 8 shows an implementation of the smart help extension within the context of a KPI builder 500 user interface as implemented by an analytics environment when the in-place option has been selected. The KPI builder user interface can comprise a data elements 510 portion, an overview 501 portion, and a data portion 502.

In accordance with an embodiment, when the in-place option is selected, a user can be presented, via a UI, selectable (e.g., via hover detection, clicking, otherwise indicating selection of an icon) help icons 800 placed at points within the UI where that has associated therewith help content 805. These help icons can be placed in places on the UI where help content has been recorded for. When selected, help content can be displayed via the user interface.

In accordance with an embodiment, the help content can comprise text, images, graphics, videos, and the like.

Figure 9:
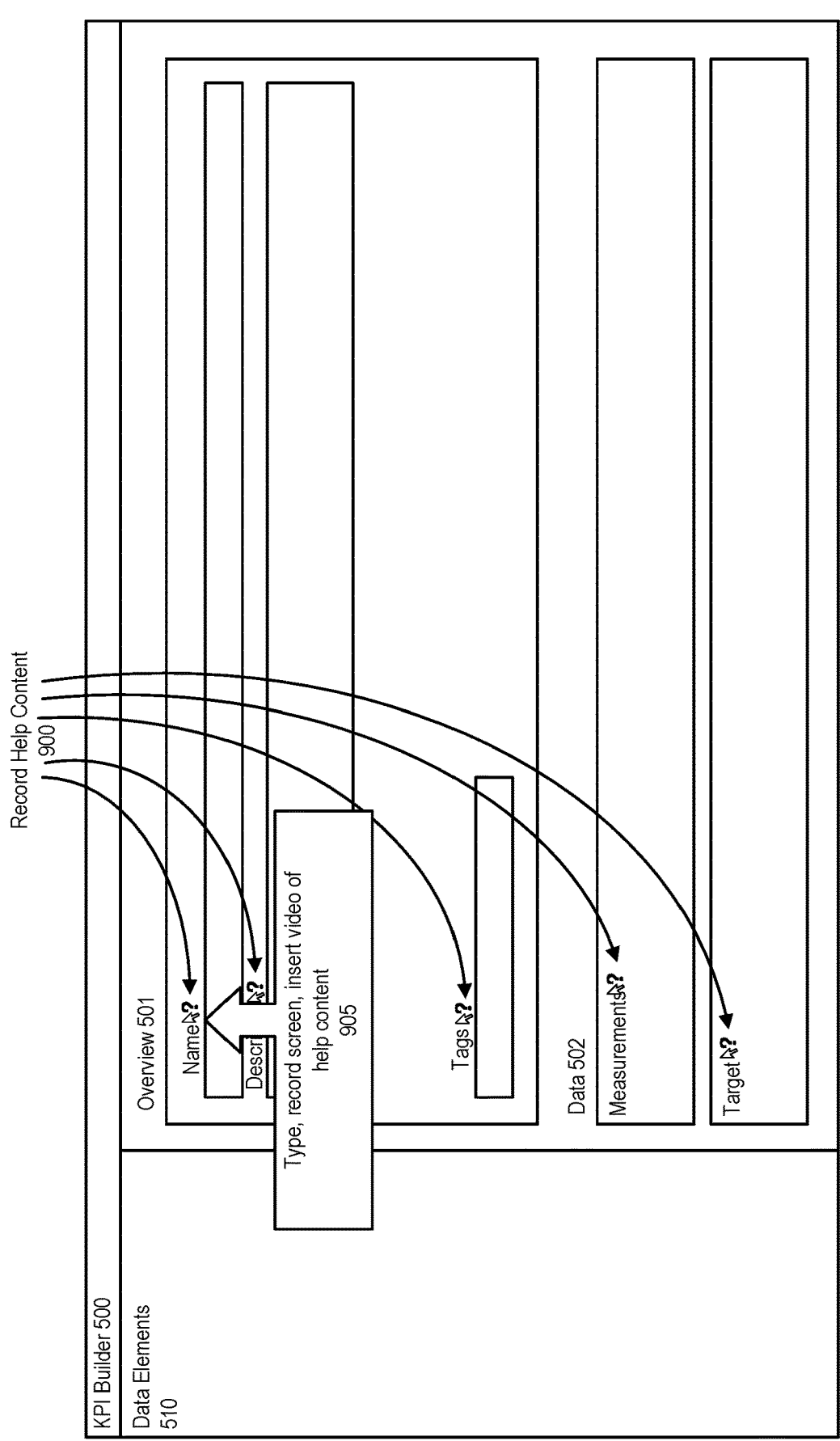
FIG. 9 shows an exemplary screenshot for a smart help plug-in, in accordance with an embodiment.

FIG. 9 shows an exemplary screenshot for a smart help plug-in, in accordance with an embodiment.

More specifically, in accordance with an embodiment, FIG. 9 shows an implementation of the smart help extension within the context of a KPI builder 500 user interface as implemented by an analytics environment when the record option has been selected. The KPI builder user interface can comprise a data elements 510 portion, an overview 501 portion, and a data portion 502.

In accordance with an embodiment, when the record option is selected, a user can be presented, via a UI, selectable (e.g., via hover detection, clicking, otherwise indicating selection of an icon) help icons 900 placed at points within the UI where the user can record help content 905 to be later displayed via, e.g., the in-place or wizard options. The recorded help content can be recorded and then associated with, e.g., an in-place option, or, for example, arranged into a wizard via the record option.

In accordance with an embodiment, the recorded help content can comprise text, images, graphics, videos, and the like.

Figure 10:
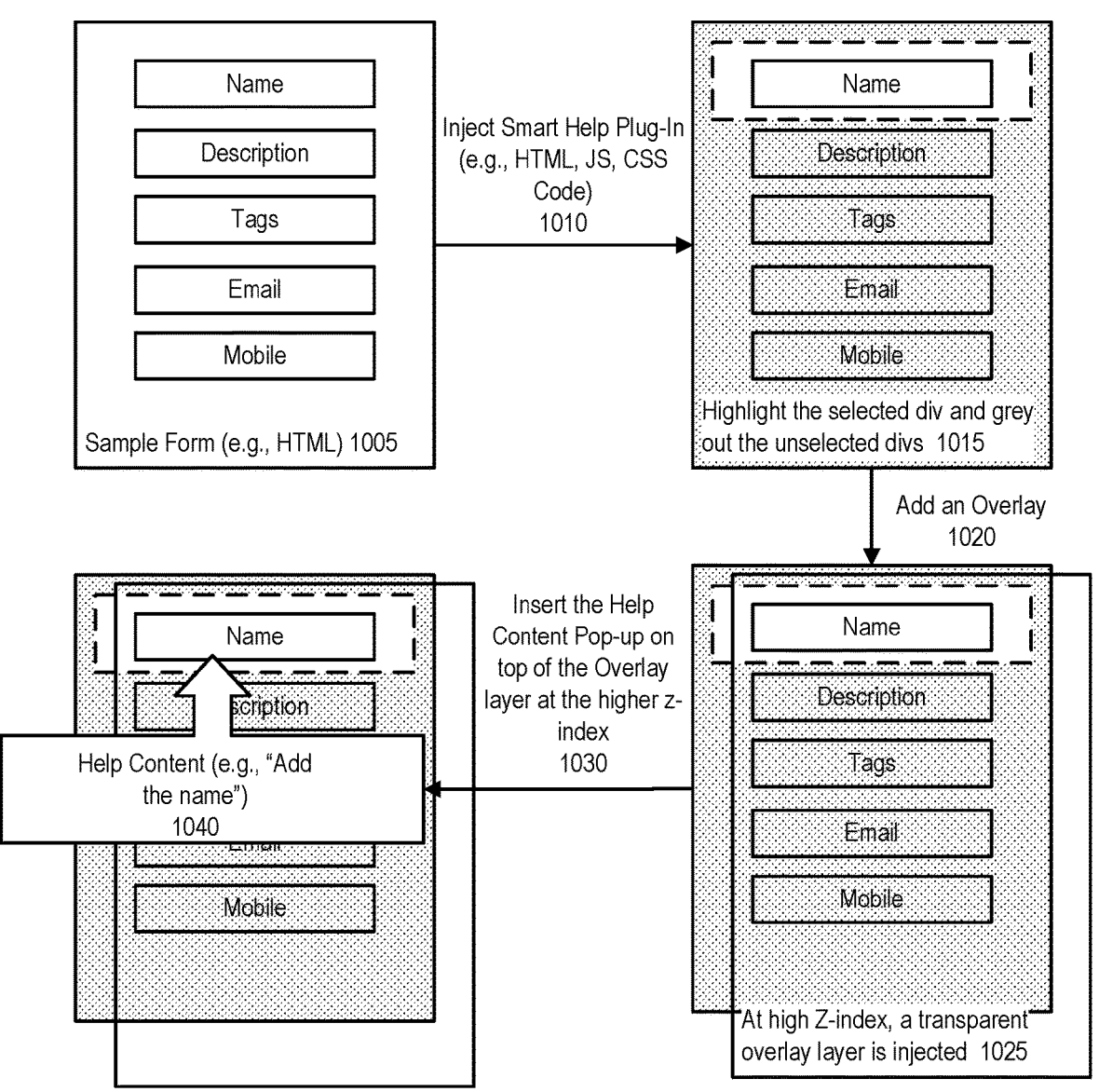
FIG. 10 shows a design for a smart help plug-in, in accordance with an embodiment.

FIG. 10 shows a design for a smart help plug-in, in accordance with an embodiment.

In accordance with an embodiment, a sample form 1005 is shown. The sample form can have one or more divs (i.e., a tag that defines a division or a section in an HTML document). As shown, the divs of 1005 comprise name, description, tags, email, and mobile.

In accordance with an embodiment, a smart help plug-in can be injected 1010 onto the sample form (e.g., HTML). This injection can be in the form of HTML, Javascript, or CSS Code, for example.

In accordance with an embodiment, a div that is to be associated with a smart help-plug in and can be highlighted, while the remaining divs can be greyed out, at 1015.

In accordance with an embodiment, an overlay 1025 can be added at 1020. This overlay can be at a high z-index. The overlay with the high-z index can define the overly within an order of overlapping HTML elements. Elements with a higher index, such as the overlay, can be placed on top of elements with a lower index, such as the sample form.

In accordance with an embodiment, at 1030, the help content plug-in can be inserted on top of the overlay layer at the higher z-index (such that it is defined with a higher index than the sample form).

In accordance with an embodiment, at 1040, a user can access help content (e.g., text such as a "add a name", an image, or a video) and can then have this help content be at the higher z-index, such that when the "name" div is gestured to, the help content plug-in is triggered and the help content is displayed.

Figure 11:
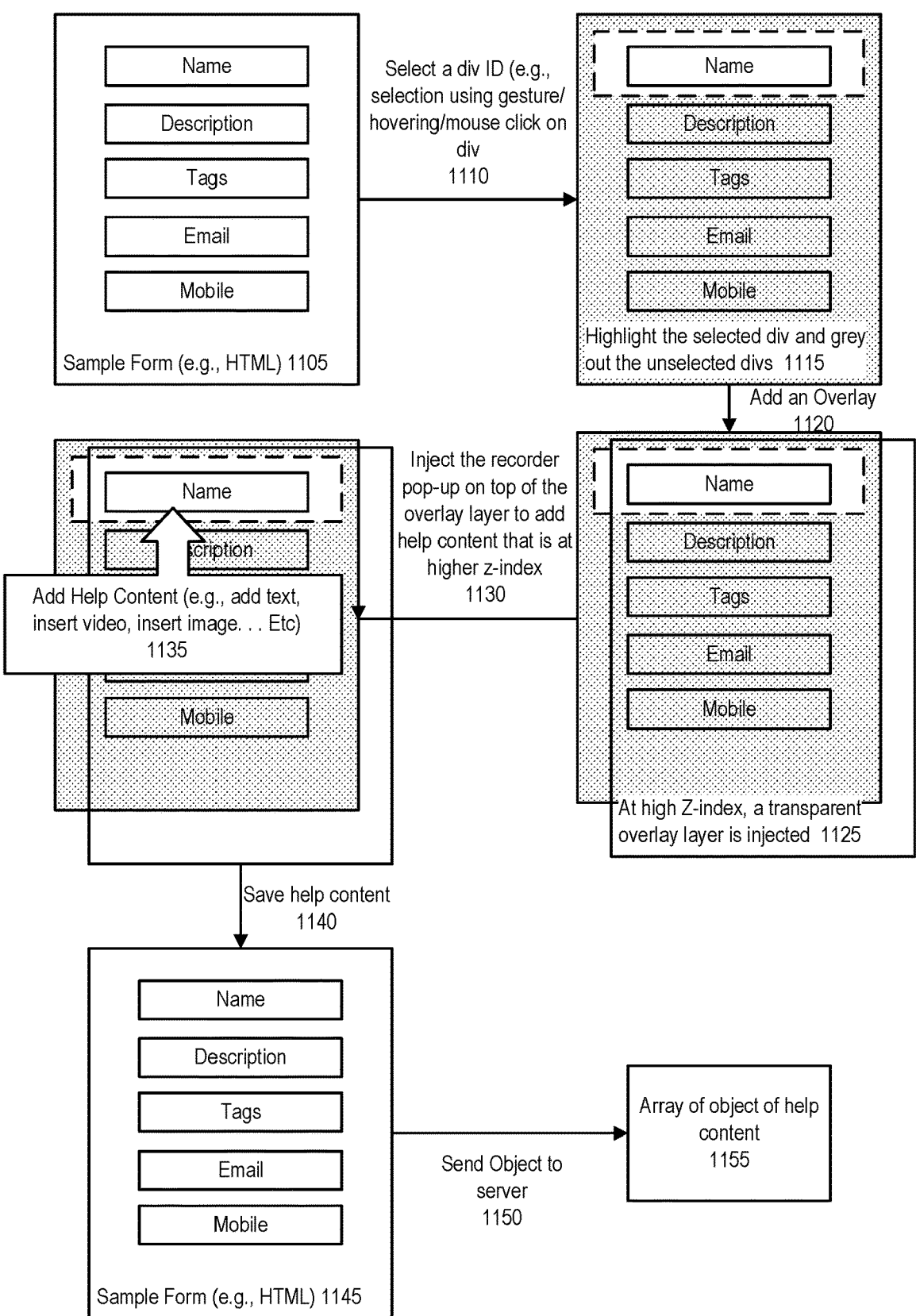
FIG. 11 shows a design for a smart help plug-in recording content, in accordance with an embodiment.

FIG. 11 shows a design for a smart help plug-in recording content, in accordance with an embodiment.

In accordance with an embodiment, a sample form 1105 is shown. The sample form can have one or more divs (i.e., a tag that defines a division or a section in an HTML document). As shown, the divs of 1105 comprise name, description, tags, email, and mobile.

In accordance with an embodiment, a one or more of the divs of 1105 can be selected at 1110. Such selection can be based upon, e.g., gesture, hovering, mouse click, etc., on the selected div.

In accordance with an embodiment, the selected div can be highlighted, while the remaining divs can be greyed out, at 1115.

In accordance with an embodiment, an overlay 1125 can be added at 1120. This overlay can be at a high z-index. The overlay with the high-z index can define the overly within an order of overlapping HTML elements. Elements with a higher index, such as the overlay, can be placed on top of elements with a lower index, such as the sample form.

In accordance with an embodiment, at 1130, the help content plug-in recorder can be injected. This recorder for the smart help pop-up can be injected on top of the overlay layer to add help content that is at higher z-index.

In accordance with an embodiment, at 1135, a user can record/insert help content (e.g., text such as a "add a name", an image, or a video) and can then have this help content be at the higher z-index, such that when the "name" div is gestured to, the help content plug-in is triggered and the help content is displayed.

In accordance with an embodiment, at 1140, the recorded/added/inserted help content can be saved, e.g., in association with the form 1145. Such saving can come in the form of, for example, a keystroke entry, or a click of a button on the sample form. The help content can be saved in the form of an object.

In accordance with an embodiment, at 1150, the saved help content in the form of an object can be sent to a server, where the object can be added to a database comprising an array of objects of help content 1155.

Figure 12:
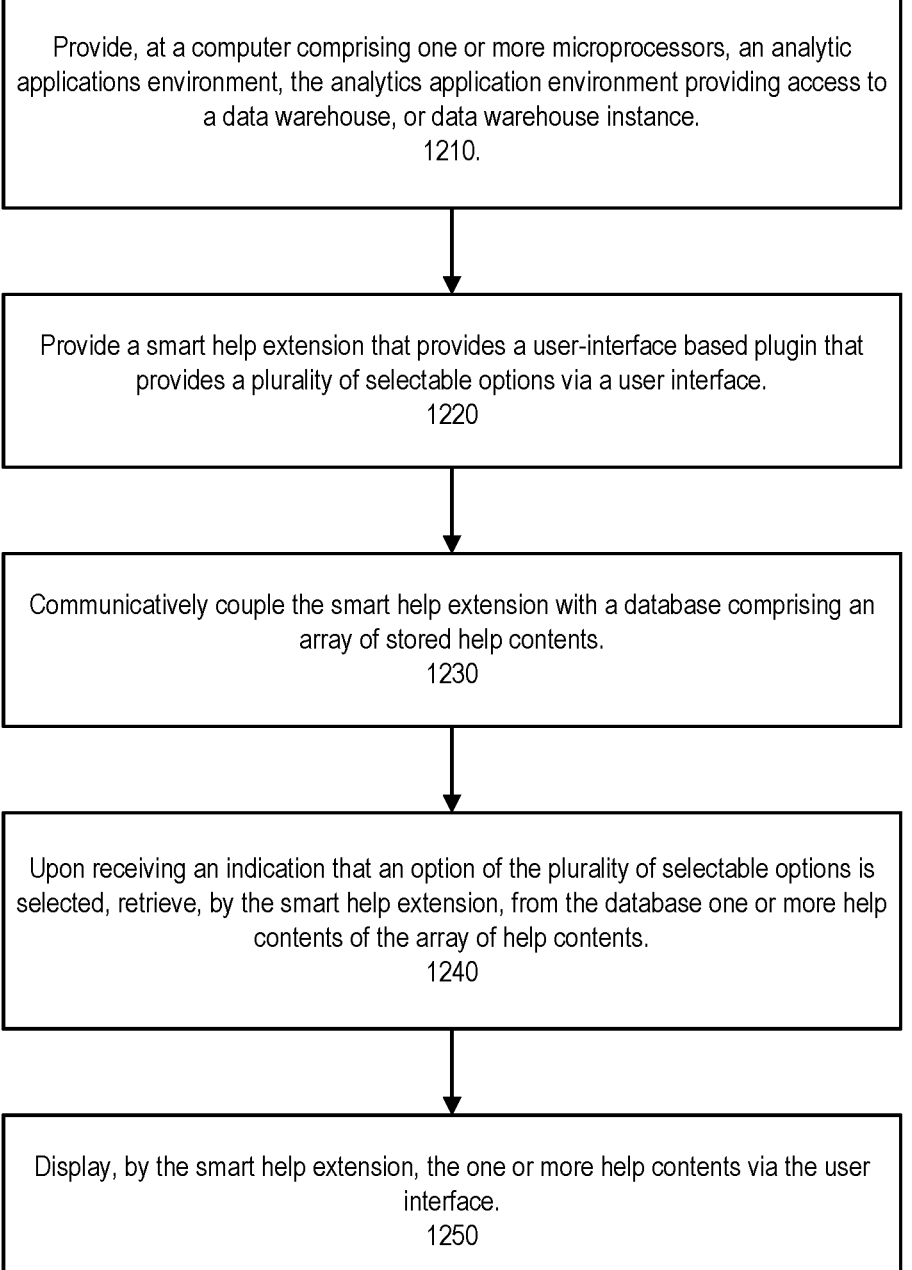
FIG. 12 is a flowchart of a method for providing a smart help browser extension for use with an analytics environment, in accordance with an embodiment.

FIG. 12 is a flowchart of a method for providing a smart help browser extension for use with an analytics environment, in accordance with an embodiment.

In accordance with an embodiment, at step 1210, the method can provide, at a computer comprising one or more microprocessors, an analytic applications environment, the analytics application environment providing access to a data warehouse, or data warehouse instance.

In accordance with an embodiment, at step 1220, the method can provide a smart help extension that provides a user-interface based plugin that provides a plurality of selectable options via a user interface.

In accordance with an embodiment, at step 1230, the method can communicatively couple the smart help extension with a database comprising an array of stored help contents.

In accordance with an embodiment, at step 1240, the method can, upon receiving an indication that an option of the plurality of selectable options is selected, retrieve, by the smart help extension, from the database one or more help contents of the array of help contents.

In accordance with an embodiment, at step 1250, the method can display, by the smart help extension, the one or more help contents via the user interface.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMS, EPROMS, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an ORACLE™ Fusion Applications environment; or within the context of a software-as-a-service (SaaS) or cloud environment such as, for example, an ORACLE™ Analytics Cloud or ORACLE™ Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A method for providing a smart help browser extension for use with an analytics environment, comprising:

providing, at a computer comprising one or more microprocessors, an analytic applications environment, the analytics application environment providing access to a data warehouse, or data warehouse instance;

providing a smart help extension that provides a user-interface based plugin that provides a plurality of selectable options via a user interface, the plurality of selectable options comprising a guided help option, a record option, and a wizard option and a wizard option, the wizard option comprising an interactive option associated with a plurality of steps stored and arranged in a sequential order;

communicatively coupling the smart help extension with a database comprising an array of stored help contents, each of the contents of the array of stored help contents being associated with, respectively, a portion of a display associated with the smart help extension;

upon receiving an indication that an option of the plurality of selectable options is selected, retrieving, by the smart help extension, from the database one or more help contents of the array of help contents; and displaying, by the smart help extension, the one or more help contents via the user interface, wherein each of the displayed one or more help contents are each, respectively, associated with a content division of the display via the user interface, and wherein at least a portion of the display of the one or more help contents associated with one of the one or more content divisions is highlighted, wherein each of the plurality of steps of the wizard option are, respectively, associated with a different content division of the display.

2. The method of claim 1, wherein the smart help extension is reusable and configurable.

3. The method of claim 1, wherein the selected help option comprises the guided help option or an in-place help;

wherein the retrieved one or more help contents comprises a plurality of help contents; and wherein the smart help extension displays the plurality of help contents in a sequential order via the user interface.

4. The method of claim 3, wherein at least one of the two or more help contents comprises a text content.

5. The method of claim 3, wherein at least one of the two or more help content comprises a video content.

6. The method of claim 3, wherein at least one of the two or more help content comprises an image content.

7. The method of claim 1, further comprising:

upon receiving a further indication that another option of the plurality of selectable options is selected, the another option comprising a record option, receiving, by the smart help extension, an input comprising a new smart help content;

saving, by the smart help extension, the new smart help content as an object; and saving the object at the database in the array of help contents.

8. A system for providing a smart help browser extension for use with an analytics environment, comprising:

a computer comprising one or more microprocessors;

an analytic applications environment provided at the computer, the analytics application environment providing access to a data warehouse, or data warehouse instance; and a smart help extension that provides a user-interface based plugin that provides a plurality of selectable options via a user interface, the plurality of selectable options comprising a guided help option, a record option, and a wizard option, the wizard option comprising an interactive option associated with a plurality of steps stored and arranged in a sequential order;

wherein the smart help extension is communicatively coupled with a database comprising an array of stored help contents, each of the contents of the array of stored help contents being associated with, respectively, a portion of a display associated with the smart help extension;

wherein upon receiving an indication that an option of the plurality of selectable options is selected, the smart help extension retrieves from the database one or more help contents of the array of help contents; and wherein the smart help extension displays the one or more help contents via the user interface, wherein each of the displayed one or more help contents are each, respectively, associated with a content division of the display via the user interface, and wherein at least a portion of the display of the one or more help contents associated with one of the one or more content divisions is highlighted, wherein each of the plurality of steps of the wizard option are respectively, associated with a different content division of the display.

9. The system of claim 8, wherein the smart help extension is reusable and configurable.

10. The system of claim 8, wherein the selected help option comprises the guided help option or an in-place help;

wherein the retrieved one or more help contents comprises a plurality of help contents; and wherein the smart help extension displays the plurality of help contents in a sequential order via the user interface.

11. The system of claim 10, wherein at least one of the two or more help contents comprises a text content.

12. The system of claim 10, wherein at least one of the two or more help content comprises a video content.

13. The system of claim 10, wherein at least one of the two or more help content comprises an image content.

14. The system of claim 8, wherein upon receiving a further indication that another option of the plurality of selectable options is selected, the another option comprising a record option, the smart help extension receives an input comprising a new smart help content;

wherein the smart help extension saves the new smart help content as an object; and wherein the object is saved at the database in the array of help contents.

15. A non-transitory computer readable storage medium having instructions thereon for providing a smart help browser extension for use with an analytics environment, which when read and executed cause a computer to perform steps comprising:

providing, at the computer, the computer comprising one or more microprocessors, an analytic applications environment, the analytics application environment providing access to a data warehouse, or data warehouse instance;

providing a smart help extension that provides a user-interface based plugin that provides a plurality of selectable options via a user interface, the plurality of selectable options comprising a guided help option, a record option, and a wizard option and a wizard option, the wizard option comprising an interactive option associated with a plurality of steps stored and arranged in a sequential order;

communicatively coupling the smart help extension with a database comprising an array of stored help contents, each of the contents of the array of stored help contents being associated with, respectively, a portion of a display associated with the smart help extension;

upon receiving an indication that an option of the plurality of selectable options is selected, retrieving, by the smart help extension, from the database one or more help contents of the array of help contents; and displaying, by the smart help extension, the one or more help contents via the user interface, wherein each of the displayed one or more help contents are each, respectively, associated with a content division of the display via the user interface, and wherein at least a portion of the display of the one or more help contents associated with one of the one or more content divisions is highlighted, wherein each of the plurality of steps of the wizard option are, respectively, associated with a different content division of the display.

16. The non-transitory computer readable storage medium of claim 15, wherein the smart help extension is reusable and configurable.

17. The non-transitory computer readable storage medium of claim 15, wherein the selected help option comprises the guided help option or an in-place help;

wherein the retrieved one or more help contents comprises a plurality of help contents; and wherein the smart help extension displays the plurality of help contents in a sequential order via the user interface.

18. The non-transitory computer readable storage medium of claim 17, wherein at least one of the two or more help contents comprises a text content.

19. The non-transitory computer readable storage medium of claim 17, wherein at least one of the two or more help content comprises a video content.

20. The non-transitory computer readable storage medium of claim 15, further comprising:

upon receiving a further indication that another option of the plurality of selectable options is selected, the another option comprising a record option, receiving, by the smart help extension, an input comprising a new smart help content;

saving, by the smart help extension, the new smart help content as an object; and saving the object at the database in the array of help contents.

\* \* \* \* \*